(No Model.)

C. A. WAYLAND.
BENCH DOG.

No. 487,106.   Patented Nov. 29, 1892.

Witnesses
Geo. E. Frech,
Rol. A. Fitzgerald.

Inventor
C. A. Wayland
By Lehmann, Pattison & Hecht.
Attorneys

UNITED STATES PATENT OFFICE.

COLUMBUS A. WAYLAND, OF MIDDLESBOROUGH, KENTUCKY.

BENCH-DOG.

SPECIFICATION forming part of Letters Patent No. 487,106, dated November 29, 1892.

Application filed March 29, 1892. Serial No. 426,904. (No model.)

*To all whom it may concern:*

Be it known that I, COLUMBUS A. WAYLAND, of Middlesborough, in the county of Bell and State of Kentucky, have invented certain new and useful Improvements in Bench-Dogs; and I do hereby declare the following to be a full, clear, and exact description of the invention, such as will enable others skilled in the art to which it pertains to make and use it, reference being had to the accompanying drawings, which form part of this specification.

My invention relates to an improvement in bench-dogs; and it consists in the novel features of construction, which will be fully described hereinafter, and more particularly referred to in the claim at the end of this specification.

The object of my invention is to provide a dog which is adjustable longitudinally as well as vertically with relation to the bench, thereby adapting it for use in connection with boards and other articles of different lengths as well as different widths.

Figure 1:
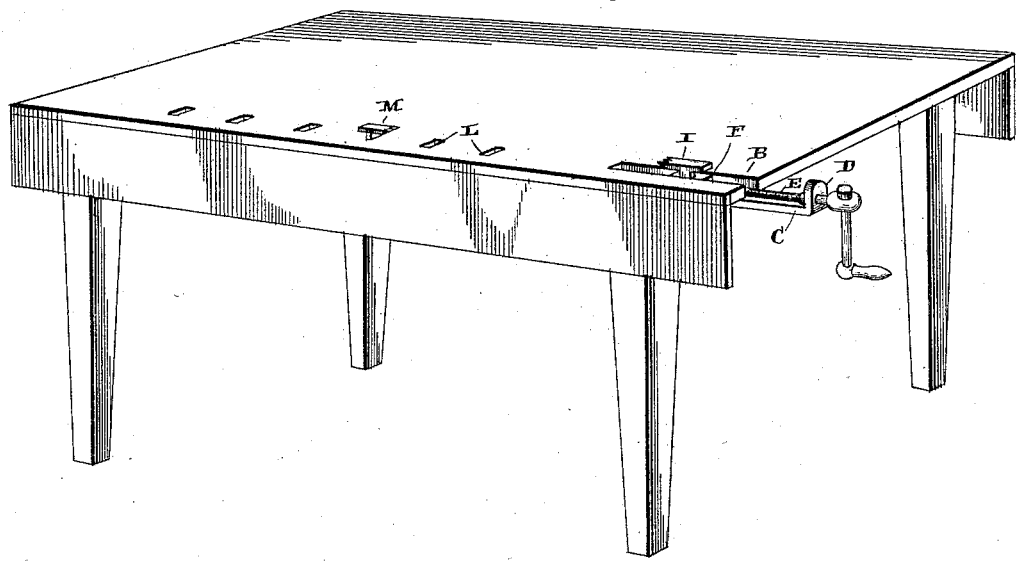
Figure 2:
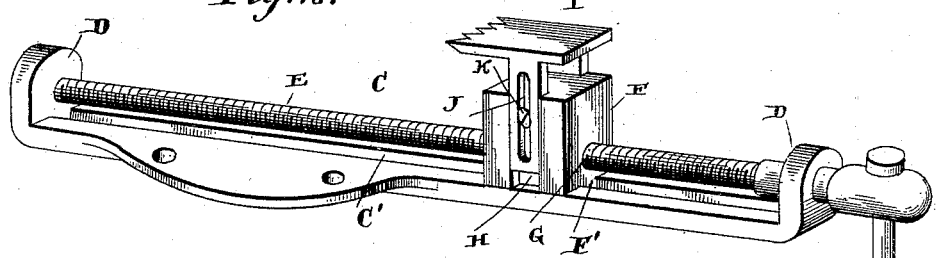
Figure 3:
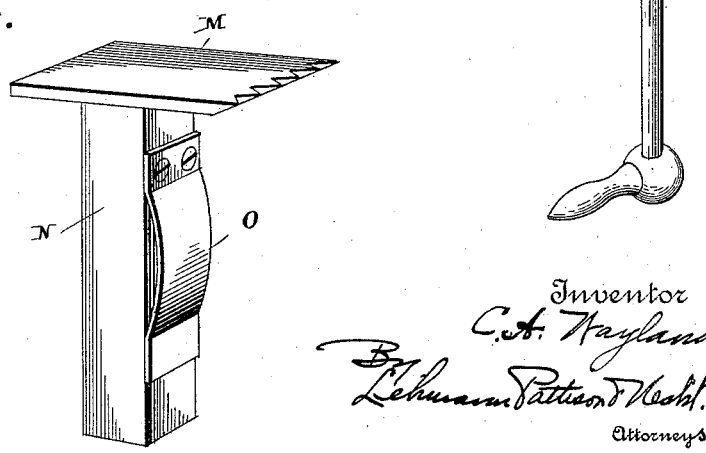

Referring to the accompanying drawings, Figure 1 is a perspective view of a bench provided with my improved dog. Fig. 2 is a similar view of the screw-shaft and movable head. Fig. 3 is a detached view of the dog.

A represents the top of a work-bench, which may be of any preferred construction, and B a slot formed in one end thereof.

C represents a bar slotted longitudinally at C', and which is formed with upturned ends D. This bar is secured to the under side of the bench-top A immediately beneath the slot B in any suitable manner. Adapted to move longitudinally within the slot B and upon the bar C is the block F, having a screw-threaded opening G, through which works the screw-shaft E, which is journaled at its ends in the upturned ends of the bar C. Upon the bottom or lower end of the block F is the projection F', which extends down into the slot C', in which it moves when the block is being adjusted. A guideway is thus formed, which materially braces the said block.

The sides of the block F are grooved, as shown at H, and projecting above the block is the dog I, having the slotted depending arms J, which fit the grooves H on the opposite sides of the block F, and by means of the screws K, which project into the block through the slots in the arms J, the dog may be adjusted vertically to any extent desired.

L represents vertical openings in the top A of the bench at intervals apart, but in line with the slot B, and these openings are for the reception of the shank N of the dog M. When it is desired to clamp a piece of board or other article to the bench, the distance between the two dogs is adjusted as nearly as possible to the length of the said article by moving the dog M in either one direction or the other, and the outer end of the article being lodged against the said dog the dog I is adjusted longitudinally to the inner end of the timber by means of the screw-shaft, thus firmly clamping the work to the bench.

In many kinds of work it is found advantageous to adjust vertically the dog I to accommodate it to the thickness of the work being operated upon.

The shank N of the dog M is provided with a flat spring O upon one of its sides, which serves to hold the said dog in the desired vertical adjustment in the openings L.

The double adjustment of the dog I is of great advantage when the latter is used singly on a bench and not in connection with the dog M.

Having thus described my invention, I claim—

The combination of a bench having a slot in its top, a longitudinally-slotted bar supported by the bench immediately below the slot in the top, block F, adapted to move on the bar and in the slot in the bench-top, and which is constructed with grooves H on its sides, projection F' on the lower end of the block, which moves in the slot of the bar, dog I, slotted arms depending from opposite sides thereof into the groove H, and a screw-shaft supported by the said bar and upon which the said block moves, substantially as shown and described.

In testimony whereof I affix my signature in presence of two witnesses.

COLUMBUS A. WAYLAND.

Witnesses:
H. STEELE,
W. B. SAMMONS.